(12) United States Patent
Swaminathan et al.

(10) Patent No.: US 12,530,815 B2
(45) Date of Patent: Jan. 20, 2026

(54) METHOD, APPARATUS AND COMPUTER PROGRAM

(71) Applicant: Nokia Technologies Oy, Espoo (FI)

(72) Inventors: Sivaramakrishnan Swaminathan, Bangalore (IN); Rakshesh Pravinchandra Bhatt, Bangalore (IN); Anatoly Andrianov, Schaumburg, IL (US); Konstantinos Samdanis, Munich (DE)

(73) Assignee: Nokia Technologies Oy, Espoo (FI)

( * ) Notice: Subject to any disclaimer, the term of this patent is extended or adjusted under 35 U.S.C. 154(b) by 621 days.

(21) Appl. No.: 17/883,052

(22) Filed: Aug. 8, 2022

(65) Prior Publication Data
US 2023/0069767 A1  Mar. 2, 2023

(30) Foreign Application Priority Data
Aug. 12, 2021 (IN) .............................. 202141036559

(51) Int. Cl.
| | | |
|---|---|---|
| G06T 11/00 | (2006.01) | |
| G06T 11/60 | (2006.01) | |
| H04L 41/0226 | (2022.01) | |
| H04L 41/0803 | (2022.01) | |
| H04L 41/0816 | (2022.01) | |
| H04L 41/14 | (2022.01) | |

(52) U.S. Cl.
CPC .............. *G06T 11/00* (2013.01); *G06T 11/60* (2013.01); *H04L 41/0226* (2013.01); *H04L 41/0803* (2013.01); *H04L 41/0816* (2013.01); *H04L 41/145* (2013.01); *G06T 2200/24* (2013.01)

(58) Field of Classification Search
None
See application file for complete search history.

(56) References Cited

U.S. PATENT DOCUMENTS

| 10,855,876 | B2 * | 12/2020 | Saito | .................. H04N 1/32122 |
|---|---|---|---|---|
| 2007/0294672 | A1 * | 12/2007 | Mosuoka | ............... G06Q 10/06 |
| | | | | 717/126 |
| 2012/0323480 | A1 * | 12/2012 | Kim | ....................... G01C 21/26 |
| | | | | 345/428 |

(Continued)

FOREIGN PATENT DOCUMENTS

| CN | 103945442 A | 7/2014 |
|---|---|---|
| CN | 104113452 A | 10/2014 |

(Continued)

OTHER PUBLICATIONS

"3rd Generation Partnership Project; Technical Specification Group Services and System Aspects; Management and orchestration; Management Data Analytics (MDA) (Release 17)", 3GPP TS 28.104, V0.0.0, Apr. 2021, pp. 1-7.

(Continued)

*Primary Examiner* — Jwalant Amin
(74) *Attorney, Agent, or Firm* — Barta Jones, PLLC

(57) ABSTRACT

There is provided an apparatus comprising means for receiving, at an image creation agent, a data set; generating, by the image creation agent, based on the received data set, an image associated with the data set, wherein pixel values in the image represent values of data entries of a plurality of rows of data of the data set; and outputting, from the image creation agent, the generated image.

3 Claims, 13 Drawing Sheets

(56) References Cited

U.S. PATENT DOCUMENTS

| | | | | |
|---|---|---|---|---|
| 2013/0303274 A1* | 11/2013 | Gadher | ............... | G07F 17/3209 |
| | | | | 463/29 |
| 2017/0352169 A1* | 12/2017 | Flanagan | ................. | G06T 7/60 |
| 2018/0260407 A1* | 9/2018 | Hofhansl | .............. | G06F 16/162 |
| 2018/0267187 A1* | 9/2018 | Al-Ali | .................... | G01V 1/308 |
| 2019/0050358 A1* | 2/2019 | Levy | .................... | G06F 13/385 |
| 2019/0059008 A1 | 2/2019 | Liu | | |
| 2019/0190804 A1* | 6/2019 | Tang | .................. | H04L 43/0852 |
| 2020/0344623 A1* | 10/2020 | Nadkarni | ............... | H04L 43/04 |
| 2021/0351973 A1* | 11/2021 | Ford | ..................... | H04L 43/067 |

FOREIGN PATENT DOCUMENTS

| | | |
|---|---|---|
| CN | 110635952 A | 12/2019 |
| CN | 110968075 A | 4/2020 |
| EP | 2122996 A1 | 11/2009 |
| WO | 2008/107020 A1 | 9/2008 |
| WO | 2017/157171 A1 | 9/2017 |
| WO | 2020/174259 A1 | 9/2020 |
| WO | 2020/247644 A1 | 12/2020 |
| WO | WO-2023083690 A1 * | 5/2023 ......... G05B 23/0283 |

OTHER PUBLICATIONS

"3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622, V16.8.1, Jun. 2021, pp. 1-66.

"3rd Generation Partnership Project; Technical Specification Group Services and System Aspects; Management and orchestration; 5G Network Resource Model (NRM); Stage 2 and stage 3 (Release 17)", 3GPP TS 28.541, V17.3.0, Jun. 2021, 450 pages.

"Architectural framework for machine learning in future networks including IMT-2020", Series Y: Global Information Infrastructure, Internet Protocol Aspects, Next-Generation Networks, Internet of Things and Smart Cities Future networks, ITU-T Y.3172, Jun. 2019, 34 pages.

"Zero-touch network and Service Management (ZSM); Reference Architecture", ETSI GS ZSM 002, V1.1.1, Aug. 2019, pp. 1-80.

* cited by examiner

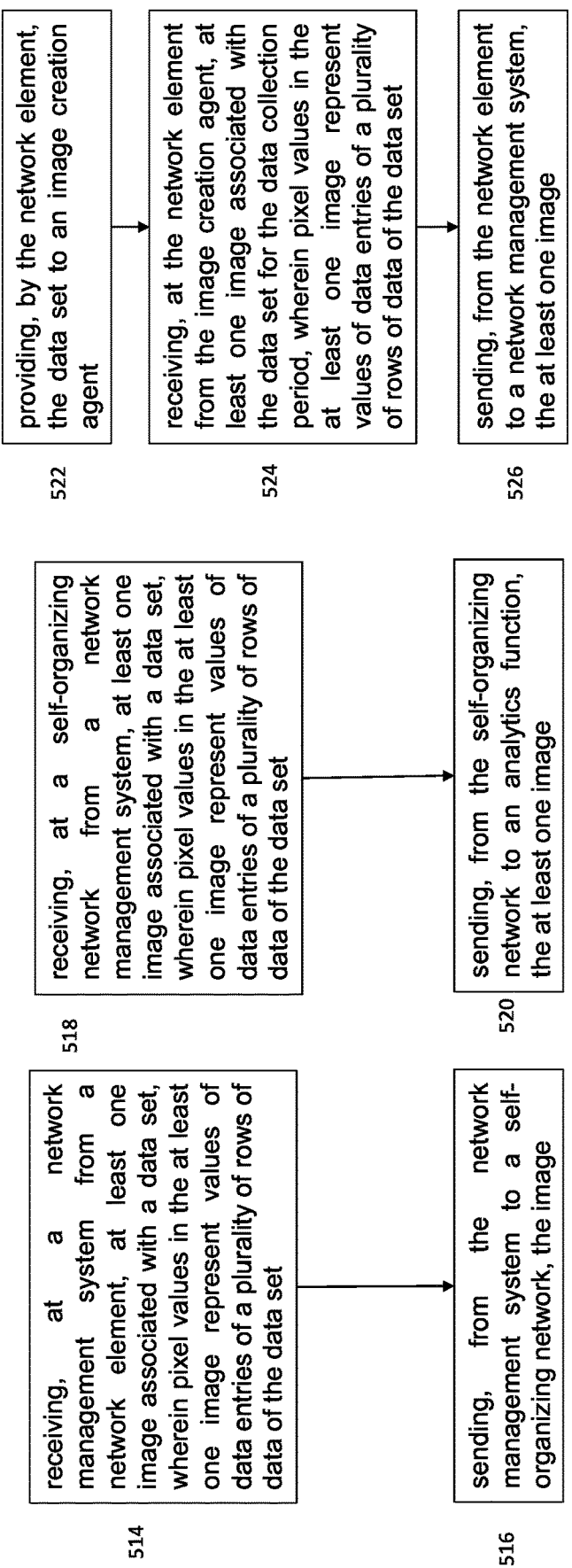

Fig. 11

METHOD, APPARATUS AND COMPUTER PROGRAM

FIELD

The present application relates to a method, apparatus, and computer program and in particular but not exclusively to analysing data generated by network elements.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving, at an image creation agent, a data set; generating, by the image creation agent, based on the received data set, an image associated with the data set, wherein pixel values in the image represent values of data entries of a plurality of rows of data of the data set; and outputting, from the image creation agent, the generated image.

The data set may comprise timestamp information for the plurality of rows of data, and wherein the means is further for: determining, for a first row of data, a first timestamp; associating the first timestamp with the data set as metadata; determining timestamp difference information between consecutive rows of data in the data set; and replacing the timestamp information in the data set with the determined timestamp difference information, wherein the generating utilises the timestamp difference information.

The data set may contain data relating to at least one of: performance measurements; key performance indicators; trace measurements; troubleshooting measurements; and streaming data.

The apparatus may be comprised in at least one of: a network element; a network management system; and a centralized self-organizing network.

According to an aspect, there is provided apparatus comprising means for: generating, at a network element, a data set over a data collection period; providing, by the network element, the data set to an image creation agent; receiving, at the network element from the image creation agent, at least one image associated with the data set for the data collection period, wherein pixel values in the at least one image represent values of data entries of a plurality of rows of data of the data set; and sending, from the network element to a network management system, the at least one image.

The means may be for: receiving, from the network management system, one or more configurations; and applying, by the network element, the one or more configurations.

The means may be for: receiving, from the network management system, information indicating a periodicity for data collection; wherein the generating is performed based on the received information.

The at least one image may comprise a series of images representing periodic data sets as video.

The apparatus may comprise the apparatus of the previous aspect.

According to an aspect, there is provided an apparatus comprising means for: receiving, at a network management system from a network element, at least one image associated with a data set, wherein pixel values in the at least one image represent values of data entries of a plurality of rows of data of the data set; and sending, from the network management system to a self-organizing network, the image.

The means may be for: receiving, from the self-organizing network, a request for data from one or more network elements including the network element; and sending, to the one or more network elements including the network element, the request for data.

The means may be for: formatting and/or packaging the received image prior to the sending.

The request for data may comprise a request for data in the form of one or more images.

The means may be for: receiving, from the self-organizing network, a request for the network management system to implement one or more actions; determining one or more configurations to apply to the one or more network elements based on the one or more actions; and sending, to the one or more network elements, the one or more configurations.

The at least one image may comprise a series of images representing periodic data sets as video According to an aspect, there is provided an apparatus comprising means for: receiving, at a self-organizing network from a network management system, at least one image associated with a data set, wherein pixel values in the at least one image represent values of data entries of a plurality of rows of data of the data set; and sending, from the self-organizing network to an analytics function, the at least one image.

The means may be for: sending, to the network management system, a request for data from one or more network elements, wherein the request for data indicates the data collection period and/or a granularity of the data.

The request for data may comprise a request for data in the form of one or more images.

The means may be further for: receiving, at the self-organizing network from the analytics function, one or more further images, wherein pixel values of the one or more further images represent values of further data entries of a plurality of rows of data for a given network element; determining one or more actions to be taken based on the one or more further images; and causing the one or more determined actions to be implemented.

The one or more determined actions may be associated with a respective one or more trigger times, and wherein causing the one or more determined actions to be implemented comprises causing the one or more determined actions to be implemented at the respective one or more trigger times.

Causing the one or more determined actions to be implemented may comprise sending a request to the network management system to implement the one or more determined actions.

The one or more further images may comprise one or more predicted images and/or one or more statistical images.

The at least one image may comprise a series of images representing periodic data sets as video.

According to an aspect, there is provided an apparatus comprising means for: receiving, at an analytics function, at least one image associated with a data set, wherein pixel values in the at least one image represent values of data entries of a plurality of rows of data of the data set; performing predictive or statistical analysis on the at least one image to generate one or more further images, wherein pixel values of the one or more further images represent values of further data entries of a plurality of rows of predicted data for the network element; and outputting, to the self-organizing network, the one or more further images.

The predictive or statistical analysis may be based on: the at least one image associated with the data set generated by the network element for the data collection period; and one or more additional images associated with additional data sets generated by the network element for additional data collection periods preceding the data collection period.

The predictive or statistical analysis may comprise applying at least one of the following to the at least one image and the additional images: convolutional models; recurrent models; generative models; and variational auto encoders.

The means may be for: storing the image for use in subsequent analysis.

The one or more further images may comprise one or more predicted images and/or one or more statistical images.

The at least one image may comprise a series of images representing periodic data sets as video.

According to an aspect, there is provided an apparatus comprising at least one processor and at least one memory including a computer program code, the at least one memory and computer program code configured to, with the at least one processor, cause the apparatus at least to: receive, at an image creation agent, a data set; generate, by the image creation agent, based on the received data set, an image associated with the data set, wherein pixel values in the image represent values of data entries of a plurality of rows of data of the data set; and output, from the image creation agent, the generated image.

The data set may comprise timestamp information for the plurality of rows of data, and wherein the at least one memory and at least one processor may be configured to cause the apparatus to: determine, for a first row of data, a first timestamp; associate the first timestamp with the data set as metadata; determine timestamp difference information between consecutive rows of data in the data set; and replace the timestamp information in the data set with the determined timestamp difference information, wherein the at least one memory and at least one processor may be configured to cause the apparatus to generate the image utilising the timestamp difference information.

The data set may contain data relating to at least one of: performance measurements; key performance indicators; trace measurements; troubleshooting measurements; and streaming data.

The apparatus may be comprised in at least one of: a network element; a network management system; and a centralized self-organizing network.

According to an aspect, there is provided an apparatus comprising at least one processor and at least one memory including a computer program code, the at least one memory and computer program code configured to, with the at least one processor, cause the apparatus at least to: generate, at a network element, a data set over a data collection period; provide, by the network element, the data set to an image creation agent; receive, at the network element from the image creation agent, at least one image associated with the data set for the data collection period, wherein pixel values in the at least one image represent values of data entries of a plurality of rows of data of the data set; and send, from the network element to a network management system, the at least one image.

The at least one memory and at least one processor may be configured to cause the apparatus to: receive, from the network management system, one or more configurations; and apply, by the network element, the one or more configurations.

The at least one memory and at least one processor may be configured to cause the apparatus to: receive, from the network management system, information indicating a periodicity for data collection; wherein the at least one memory and at least one processor may be configured to cause the apparatus to generate the data set based on the received information.

The at least one image may comprise a series of images representing periodic data sets as video.

The apparatus may comprise the apparatus of the previous aspect.

According to an aspect, there is provided an apparatus comprising at least one processor and at least one memory including a computer program code, the at least one memory and computer program code configured to, with the at least one processor, cause the apparatus at least to: receive, at a network management system from a network element, at least one image associated with a data set, wherein pixel values in the at least one image represent values of data entries of a plurality of rows of data of the data set; and send, from the network management system to a self-organizing network, the image.

The at least one memory and at least one processor may be configured to cause the apparatus to: receive, from the self-organizing network, a request for data from one or more network elements including the network element; and send, to the one or more network elements including the network element, the request for data.

The at least one memory and at least one processor may be configured to cause the apparatus to: format and/or package the received image prior to the sending.

The request for data may comprise a request for data in the form of one or more images.

The at least one memory and at least one processor may be configured to cause the apparatus to: receive, from the self-organizing network, a request for the network management system to implement one or more actions; determine one or more configurations to apply to the one or more network elements based on the one or more actions; and send, to the one or more network elements, the one or more configurations.

The at least one image may comprise a series of images representing periodic data sets as video According to an aspect, there is provided an apparatus comprising at least one processor and at least one memory including a computer program code, the at least one memory and computer program code configured to, with the at least one processor, cause the apparatus at least to: receive, at a self-organizing network from a network management system, at least one image associated with a data set, wherein pixel values in the at least one image represent values of data entries of a plurality of rows of data of the data set; and send, from the self-organizing network to an analytics function, the at least one image.

The at least one memory and at least one processor may be configured to cause the apparatus to: send, to the network management system, a request for data from one or more network elements, wherein the request for data indicates the data collection period and/or a granularity of the data.

The request for data may comprise a request for data in the form of one or more images.

The at least one memory and at least one processor may be configured to cause the apparatus to: receive, at the self-organizing network from the analytics function, one or more further images, wherein pixel values of the one or more further images represent values of further data entries of a plurality of rows of data for a given network element; determine one or more actions to be taken based on the one or more further images; and cause the one or more determined actions to be implemented.

The one or more determined actions may be associated with a respective one or more trigger times, and wherein the at least one memory and at least one processor may be configured to cause the apparatus to cause the one or more determined actions to be implemented by causing the one or more determined actions to be implemented at the respective one or more trigger times.

The at least one memory and at least one processor may be configured to cause the apparatus to causing the one or more determined actions to be implemented by sending a request to the network management system to implement the one or more determined actions.

The one or more further images may comprise one or more predicted images and/or one or more statistical images.

The at least one image may comprise a series of images representing periodic data sets as video.

According to an aspect, there is provided an apparatus comprising at least one processor and at least one memory including a computer program code, the at least one memory and computer program code configured to, with the at least one processor, cause the apparatus at least to: receive, at an analytics function, at least one image associated with a data set, wherein pixel values in the at least one image represent values of data entries of a plurality of rows of data of the data set; perform predictive or statistical analysis on the at least one image to generate one or more further images, wherein pixel values of the one or more further images represent values of further data entries of a plurality of rows of predicted data for the network element; and output, to the self-organizing network, the one or more further images.

The predictive or statistical analysis may be based on: the at least one image associated with the data set generated by the network element for the data collection period; and one or more additional images associated with additional data sets generated by the network element for additional data collection periods preceding the data collection period.

The at least one memory and at least one processor may be configured to cause the apparatus to perform the predictive or statistical analysis by applying at least one of the following to the at least one image and the additional images: convolutional models; recurrent models; generative models; and variational auto encoders.

The at least one memory and at least one processor may be configured to cause the apparatus to: store the image for use in subsequent analysis.

The one or more further images may comprise one or more predicted images and/or one or more statistical images.

The at least one image may comprise a series of images representing periodic data sets as video.

According to an aspect, there is provided a method comprising: receiving, at an image creation agent, a data set; generating, by the image creation agent, based on the received data set, an image associated with the data set, wherein pixel values in the image represent values of data entries of a plurality of rows of data of the data set; and outputting, from the image creation agent, the generated image.

The data set may comprise timestamp information for the plurality of rows of data, and wherein the method may comprise: determining, for a first row of data, a first timestamp; associating the first timestamp with the data set as metadata; determining timestamp difference information between consecutive rows of data in the data set; and replacing the timestamp information in the data set with the determined timestamp difference information, wherein the generating utilises the timestamp difference information.

The data set may contain data relating to at least one of: performance measurements; key performance indicators; trace measurements; troubleshooting measurements; and streaming data.

The image creation agent may be comprised in at least one of: a network element; a network management system; and a centralized self-organizing network.

According to an aspect, there is provided a method comprising: generating, at a network element, a data set over a data collection period; providing, by the network element, the data set to an image creation agent; receiving, at the network element from the image creation agent, at least one image associated with the data set for the data collection period, wherein pixel values in the at least one image represent values of data entries of a plurality of rows of data of the data set; and sending, from the network element to a network management system, the at least one image.

The method may comprise: receiving, from the network management system, one or more configurations; and applying, by the network element, the one or more configurations.

The method may comprise: receiving, from the network management system, information indicating a periodicity for data collection; wherein the generating is performed based on the received information.

The at least one image may comprise a series of images representing periodic data sets as video.

According to an aspect, there is provided a method comprising: receiving, at a network management system from a network element, at least one image associated with a data set, wherein pixel values in the at least one image represent values of data entries of a plurality of rows of data of the data set; and sending, from the network management system to a self-organizing network, the image.

The method may comprise: receiving, from the self-organizing network, a request for data from one or more network elements including the network element; and sending, to the one or more network elements including the network element, the request for data.

The method may comprise: formatting and/or packaging the received image prior to the sending.

The request for data may comprise a request for data in the form of one or more images.

The method may comprise: receiving, from the self-organizing network, a request for the network management system to implement one or more actions; determining one or more configurations to apply to the one or more network elements based on the one or more actions; and sending, to the one or more network elements, the one or more configurations.

The at least one image may comprise a series of images representing periodic data sets as video According to an aspect, there is provided a method comprising: receiving, at a self-organizing network from a network management system, at least one image associated with a data set, wherein pixel values in the at least one image represent values of data entries of a plurality of rows of data of the data set; and sending, from the self-organizing network to an analytics function, the at least one image.

The method may comprise: sending, to the network management system, a request for data from one or more network elements, wherein the request for data indicates the data collection period and/or a granularity of the data.

The request for data may comprise a request for data in the form of one or more images.

The method may comprise: receiving, at the self-organizing network from the analytics function, one or more further images, wherein pixel values of the one or more further images represent values of further data entries of a plurality of rows of data for a given network element; determining one or more actions to be taken based on the one or more further images; and causing the one or more determined actions to be implemented.

The one or more determined actions may be associated with a respective one or more trigger times, and wherein causing the one or more determined actions to be implemented comprises causing the one or more determined actions to be implemented at the respective one or more trigger times.

Causing the one or more determined actions to be implemented may comprise sending a request to the network management system to implement the one or more determined actions.

The one or more further images may comprise one or more predicted images and/or one or more statistical images.

The at least one image may comprise a series of images representing periodic data sets as video.

According to an aspect, there is provided a method comprising: receiving, at an analytics function, at least one image associated with a data set, wherein pixel values in the at least one image represent values of data entries of a plurality of rows of data of the data set; performing predictive or statistical analysis on the at least one image to generate one or more further images, wherein pixel values of the one or more further images represent values of further data entries of a plurality of rows of predicted data for the network element; and outputting, to the self-organizing network, the one or more further images.

The predictive or statistical analysis may be based on: the at least one image associated with the data set generated by the network element for the data collection period; and one or more additional images associated with additional data sets generated by the network element for additional data collection periods preceding the data collection period.

The predictive or statistical analysis may comprise applying at least one of the following to the at least one image and the additional images: convolutional models; recurrent models;
generative models; and variational auto encoders.

The method may comprise: storing the image for use in subsequent analysis.

The one or more further images may comprise one or more predicted images and/or one or more statistical images.

The at least one image may comprise a series of images representing periodic data sets as video.

According to an aspect, there is provided a computer readable medium comprising program instructions for causing an apparatus to perform at least the following: receiving, at an image creation agent, a data set; generating, by the image creation agent, based on the received data set, an image associated with the data set, wherein pixel values in the image represent values of data entries of a plurality of rows of data of the data set; and outputting, from the image creation agent, the generated image.

The data set may comprise timestamp information for the plurality of rows of data, and wherein the method may comprise: determining, for a first row of data, a first timestamp; associating the first timestamp with the data set as metadata; determining timestamp difference information between consecutive rows of data in the data set; and replacing the timestamp information in the data set with the determined timestamp difference information, wherein the generating utilises the timestamp difference information.

The data set may contain data relating to at least one of: performance measurements; key performance indicators; trace measurements; troubleshooting measurements; and streaming data.

The image creation agent may be comprised in at least one of: a network element; a network management system; and a centralized self-organizing network.

According to an aspect, there is provided a computer readable medium comprising program instructions for causing an apparatus to perform at least the following: generating, at a network element, a data set over a data collection period; providing, by the network element, the data set to an image creation agent; receiving, at the network element from the image creation agent, at least one image associated with the data set for the data collection period, wherein pixel values in the at least one image represent values of data entries of a plurality of rows of data of the data set; and sending, from the network element to a network management system, the at least one image.

The apparatus may be caused to perform: receiving, from the network management system, one or more configurations; and applying, by the network element, the one or more configurations.

The apparatus may be caused to perform: receiving, from the network management system, information indicating a periodicity for data collection; wherein the generating is performed based on the received information.

The at least one image may comprise a series of images representing periodic data sets as video.

According to an aspect, there is provided a computer readable medium comprising program instructions for causing an apparatus to perform at least the following: receiving, at a network management system from a network element, at least one image associated with a data set, wherein pixel values in the at least one image represent values of data entries of a plurality of rows of data of the data set; and sending, from the network management system to a self-organizing network, the image.

The apparatus may be caused to perform: receiving, from the self-organizing network, a request for data from one or more network elements including the network element; and sending, to the one or more network elements including the network element, the request for data.

The apparatus may be caused to perform: formatting and/or packaging the received image prior to the sending.

The request for data may comprise a request for data in the form of one or more images.

The apparatus may be caused to perform: receiving, from the self-organizing network, a request for the network management system to implement one or more actions; determining one or more configurations to apply to the one or more network elements based on the one or more actions; and sending, to the one or more network elements, the one or more configurations.

The at least one image may comprise a series of images representing periodic data sets as video According to an aspect, there is provided a computer readable medium comprising program instructions for causing an apparatus to perform at least the following: receiving, at a self-organizing network from a network management system, at least one image associated with a data set, wherein pixel values in the at least one image represent values of data entries of a plurality of rows of data of the data set; and sending, from the self-organizing network to an analytics function, the at least one image.

The apparatus may be caused to perform: sending, to the network management system, a request for data from one or more network elements, wherein the request for data indicates the data collection period and/or a granularity of the data.

The request for data may comprise a request for data in the form of one or more images.

The apparatus may be caused to perform: receiving, at the self-organizing network from the analytics function, one or more further images, wherein pixel values of the one or more further images represent values of further data entries of a plurality of rows of data for a given network element; determining one or more actions to be taken based on the one or more further images; and causing the one or more determined actions to be implemented.

The one or more determined actions may be associated with a respective one or more trigger times, and wherein causing the one or more determined actions to be implemented comprises causing the one or more determined actions to be implemented at the respective one or more trigger times.

Causing the one or more determined actions to be implemented may comprise sending a request to the network management system to implement the one or more determined actions.

The one or more further images may comprise one or more predicted images and/or one or more statistical images.

The at least one image may comprise a series of images representing periodic data sets as video.

According to an aspect, there is provided a computer readable medium comprising program instructions for causing an apparatus to perform at least the following: receiving, at an analytics function, at least one image associated with a data set, wherein pixel values in the at least one image represent values of data entries of a plurality of rows of data of the data set; performing predictive or statistical analysis on the at least one image to generate one or more further images, wherein pixel values of the one or more further images represent values of further data entries of a plurality of rows of predicted data for the network element; and outputting, to the self-organizing network, the one or more further images.

The predictive or statistical analysis may be based on: the at least one image associated with the data set generated by the network element for the data collection period; and one or more additional images associated with additional data sets generated by the network element for additional data collection periods preceding the data collection period.

The predictive or statistical analysis may comprise applying at least one of the following to the at least one image and the additional images: convolutional models; recurrent models; generative models; and variational auto encoders.

The apparatus may be caused to perform: storing the image for use in subsequent analysis.

The one or more further images may comprise one or more predicted images and/or one or more statistical images.

The at least one image may comprise a series of images representing periodic data sets as video.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIGS. 5a, 5b, 5c, 5d and 5e show a method according to some examples;

FIG. 11 shows an example CSV file generated from a text log file of troubleshooting data.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
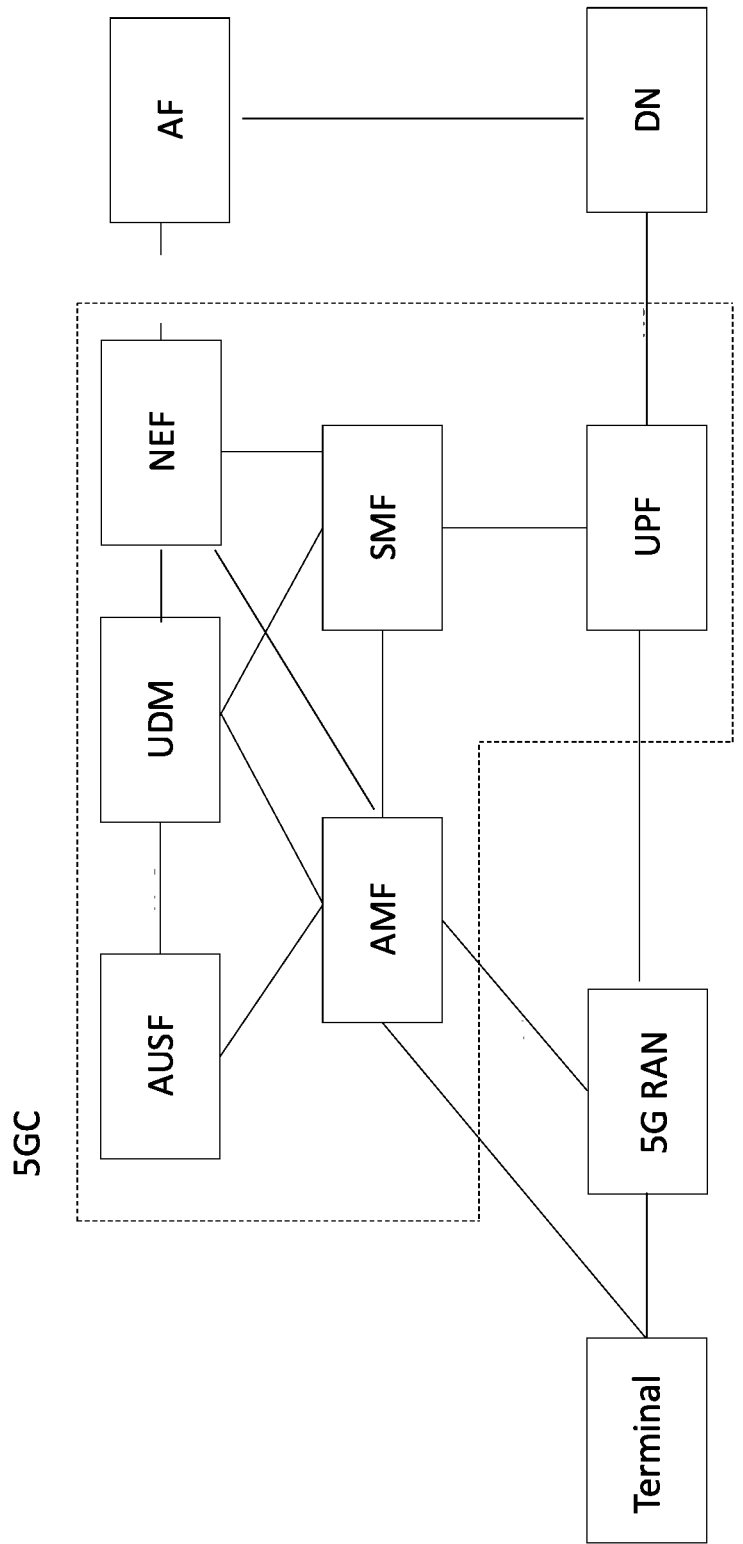
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
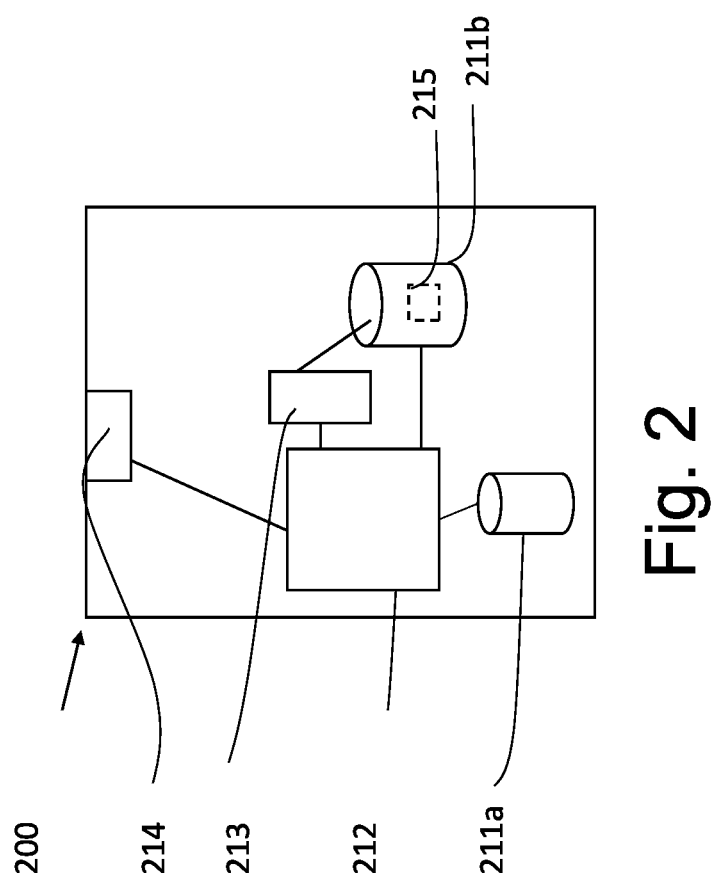
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
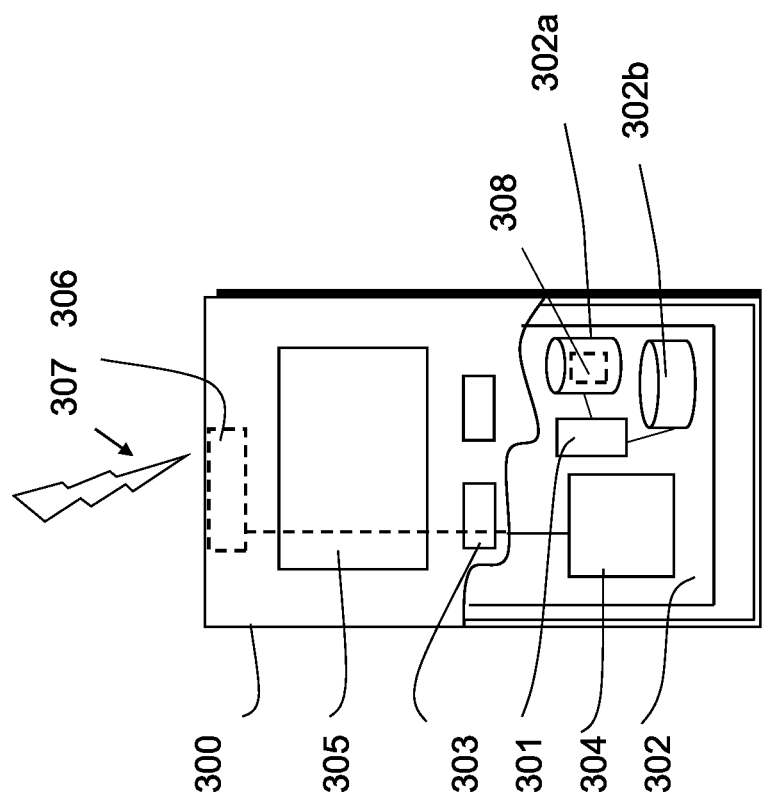
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In 4G wireless telecommunications networks, the concept of Self Organizing Networks (SON) (which may also be known as Self-Optimizing Networks in some examples) was introduced. In 5G, Management Data Analytics (MDA) was introduced, which can assist SON operation by providing predictions and statistical insights. Predicting the Network Performance for various parts of the network is an important aspect and can help anticipate many service problems in the network, and anticipate the actions for mitigating or avoiding those service problems in order to ensure high network performance at all times.

A large number of Performance Measurement (PM) counters may be reported by every cell in the network. SON may make use of these PM Counters in order to apply various optimizations at run-time. Network operators can configure the periodicity of collection of these counters, e.g., every 5 mins, 15 minutes, 30 minutes or 1 hour.

The smaller the PM collection granularity, the larger the amount of available data for analysis and predictions. Having a larger amount of data may be better for prediction accuracies. However, this may also result in very large storage space requirements. A larger PM collection granularity may require a smaller amount of storage space than the data obtained with a small PM collection granularity. However, the smaller amount of data from the larger PM collection granularity results in prediction accuracies getting compromised relative to the smaller PM granularity.

Figure 4:
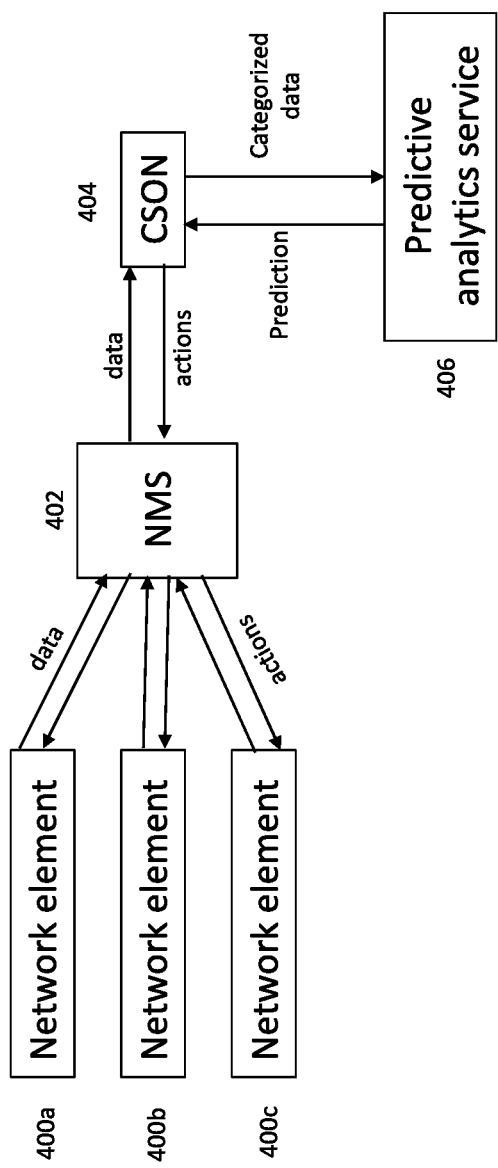
FIG. 4 shows a representation of the flow of data and utilization of predictive analytics services according to some examples.

Reference is made to FIG. 4, which shows a representation of the flow of data and utilization of predictive analytics services according to some examples.

In the example of FIG. 4, a plurality of network elements 400*a-c*, generate data, such as but not limited to Periodic Trace Data, Periodic Streaming Data, and/or Periodic PM Counters, and send the generated data to Network Management System NMS 402. NMS 402 may be a management node or a set of management nodes. Different management systems may be implemented to manage different granularities—for example, an element management system EMS may manage an element, or a domain management system DMS may manage a domain, which may comprise a set of elements.

NMS 402 sends the received data to centralized SON (CSON) 404. CSON 404 categorizes the received data and sends the categorized data to the Predictive Analytics Service 406.

The Predictive Analytics Service may perform various analytical operations or prediction techniques on the received data. For example, the Predictive Analytics Service may perform one or more of trace prediction, streaming data prediction, or PM/KPI prediction operations.

The Predictive Analytics Service 406 then provides an output prediction to CSON 404. CSON 404 determines one or more proactive actions to be taken at one or more of the network elements 400*a-c*, and passes those actions to NMS 402, which in turn forwards the proactive actions on to the respective network elements 400*a-c*.

There may be a plurality of data predictors for each prediction technique. Each data predictor may have multiple artificial Intelligence (AI) or Machine Learning (ML) pipelines as defined in ITU-T Y.3172.

At each time instant, one data predictor may predict a single feature. Thus, to be able to predict multiple features, multiple data predictors may be required. In some examples, the inputs and design of the data predictors may be different. While similar kinds of algorithms may be used across the data predictors, re-use of models across a variety of data predictors may be challenging. As such, each model may need to be independently maintained, stored, and trained periodically.

The volume of data expected from a 5G network, and the rate at which this data is to be processed for prediction, may demand extremely high processing and storage resources.

To accurately predict large number of data points simultaneously (such as PMs, Trace data, troubleshooting data, streaming data, and any other form of data), a huge amount of historical data may be used. For example, if there is a need to simultaneously predict 100 KPIs for the next 10 days, with high accuracy, a huge amount of historical data may be needed for all 100 KPIs. The system designer therefore determines a trade-off between AI/ML prediction accuracies, state of the art algorithms, and the amount of storage space needed for the historic data.

Table 1 below shows an example storage requirement for different data aggregation frequencies for collecting PM counters from 50,000 cells over a 24 hour period.

TABLE 1

| Aggregation frequency | Storage requirement (gigabytes) |
| --- | --- |
| Daily | 0.7-1 |
| Hourly | 17-19 |
| 15 minutes | 55-70 |
| 5 minutes | 170-190 |

It is anticipated that 5G networks will have a much higher number of cells, and that network complexity may further increase the number of PM counters and the like that will be collected.

The large volume of data to be collected will use a correspondingly larger amount of storage capacity and processing power (in terms of CPU and RAM requirements) to process the data for better prediction accuracies of AI/ML algorithms.

Maintaining such a large storage capacity over a period of time may be challenging. While utilising a smaller data storage is a possibility, as mentioned above, this may lead to compromises in the accuracy of AI/ML algorithms as not as much data is available for predictions.

With exponentially increasing network elements and the data generated from them, it would be useful to have an architecture that enables the prediction of multiple features at simultaneously. Such an elimination may allow for the elimination of the use of different predictors for different features.

Reference is made to FIGS. 5*a*-5*e*, which show a method according to some examples.

Figures 5A, 5B:
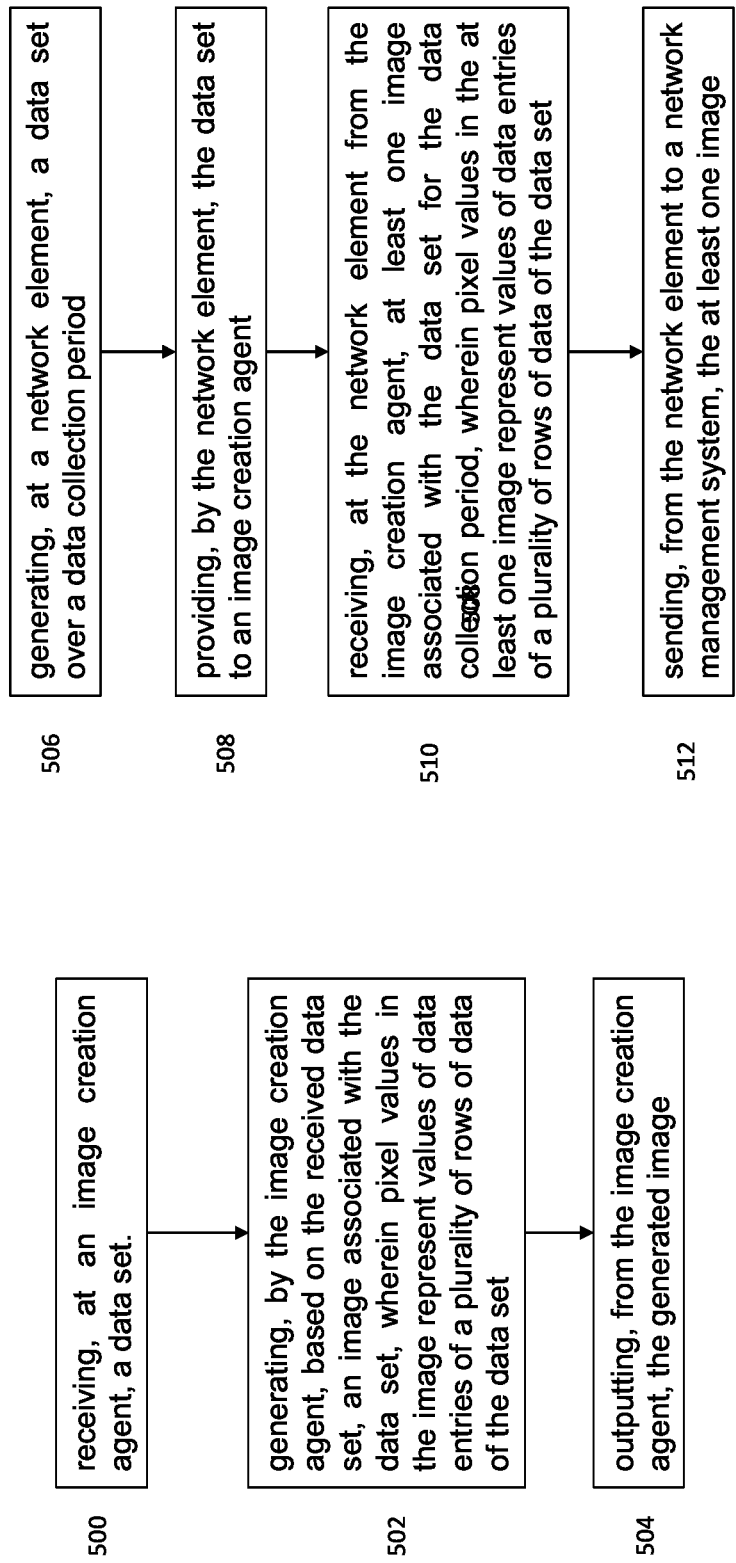

As shown in FIG. 5*a*, at 500 the method may comprise receiving, at an image creation agent, a data set.

At 502, the method may comprise generating, by the image creation agent, based on the received data set, an image associated with the data set, wherein pixel values in the image represent values of data entries of a plurality of rows of data of the data set.

At 504, the method may comprise outputting, from the image creation agent, the generated image.

As shown in FIG. 5*b*, at 506 the method may comprise generating, at a network element, a data set over a data collection period.

At 508, the method may comprise providing, by the network element, the data set to an image creation agent.

At 510, the method may comprise receiving, at the network element from the image creation agent, at least one image associated with the data set for the data collection period, wherein pixel values in the at least one image represent values of data entries of a plurality of rows of data of the data set.

At 512, the method may comprise sending, from the network element to a network management system, the at least one image.

As shown in FIG. 5*c*, at 514 the method may comprise receiving, at a network management system from a network element, at least one image associated with a data set, wherein pixel values in the at least one image represent values of data entries of a plurality of rows of data of the data set.

At 516, the method may comprise sending, from the network management system to a self-organizing network, the image.

As shown in FIG. 5*d*, at 518 the method may comprise receiving, at a self-organizing network from a network management system, at least one image associated with a data set, wherein pixel values in the at least one image represent values of data entries of a plurality of rows of data of the data set.

At 520, the method may comprise sending, from the self-organizing network to an analytics function, the at least one image.

As shown in FIG. 5*e*, at 522, the method may comprise receiving, at an analytics function, at least one image associated with a data set, wherein pixel values in the at least one image represent values of data entries of a plurality of rows of data of the data set.

At 524, the method may comprise performing predictive or statistical analysis on the at least one image to generate one or more further images, wherein pixel values of the one or more further images represent values of further data entries of a plurality of rows of predicted data for the network element.

At 526, the method may comprise outputting, to the self-organizing network, the one or more further images.

In some examples, matrices of collected data of various types, such as but not limited to PM counters, KPIs, Trace data, Troubleshooting data, and Streaming data, are converted into images. The images may then be used for predictive analysis, instead of the raw data. Advantageously, storing the data as images, rather than raw data, may reduce the overall storage capacity requirement, and may lead to more efficient data storage.

The conversion may be performed at any stage of the flow. In some examples, an image creation agent (ICA) may create the images from the data. The ICA may be hosted in the network element, NMS, or CSON.

Figure 6:
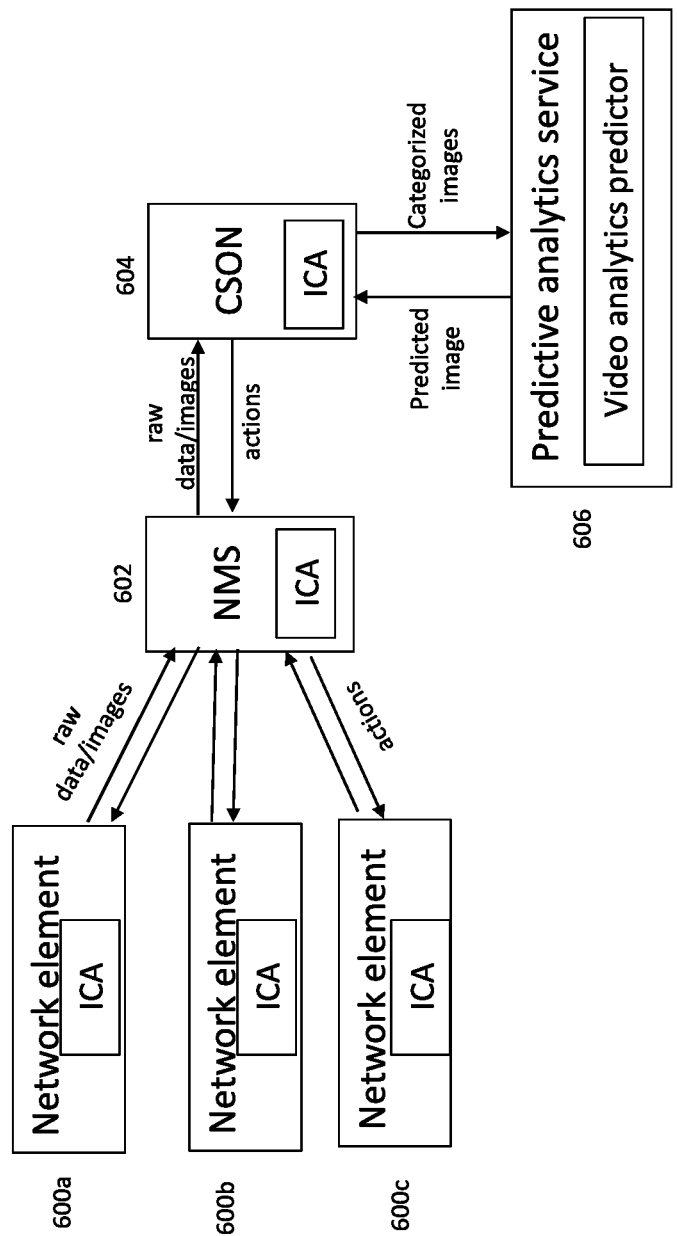
FIG. 6 shows a representation of the flow of data and utilization of predictive analytics services according to some examples.

For example, FIG. 6 shows an example flow of data and utilization of predictive analytics services, which is based on a modified version of the flow of FIG. 4.

In the example of FIG. 6, the plurality of network elements 600*a-c*, generate data, such as but not limited to Periodic Trace Data, Periodic Streaming Data, and/or Periodic PM Counters. The generated data may be converted into images by the ICA and sent to NMS 602. Alternatively, the generated data may be sent to NMS 602 (without being converted to images), i.e. the raw data may be sent.

NMS 602 may send the received images and/or data to CSON 604. If NMS 602 receives data from the network elements 600*a-c*, the ICA at the NMS 602 may convert received data into images for sending to CSON 604.

The ICA at CSON 604 converts any received data into images. CSON 604 then categorizes the received images and sends the categorized images to the Predictive Analytics Service 606.

The Predictive Analytics Service may perform video analytics-based predictions on the received images to generate one or more predicted image frames. That is to say, the received images may be used as frames of a video, and the Predictive Analytics Service may apply video analytics in order to predict data points based on the frames. In some examples, the prediction may be performed in one-shot, and in further examples may be performed for multiple time-instances in future, for example predicting all the PM counter values for the next N hours at-a-time. As another example, the Predictive Analytics Service may predict all the traces for next N hours from all the SW functions in the cell.

Using state-of-the-art image analytics and video analytics may allow highly accurate predictions of multiple data points in one-shot, while still ensuring optimal usage of CPU, RAM, and storage consumption. Predicting multiple data points in one-shot can help anticipating the complete system behaviour. This method can potentially reduce the storage requirements by more than 95% for troubleshooting data (text format logs), and still ensure better prediction accuracies. The amount of storage optimization can be specific to the use case.

The Predictive Analytics Service may then provide one or more predicted images to CSON 604. CSON 604 then determines one or more actions to be taken based on the received predicted images. For example, CSON may determine one or more actions to be taken by one or more of network elements 600*a-c*. CSON 604 may send the determined actions to NMS 602, which triggers the network element(s) to implement the determined actions.

While examples discussed herein relate to wireless networks, it should be understood that the concepts are not limited to such networks, and may be applied for any enterprise big-data storage and analytics.

Figure 7:
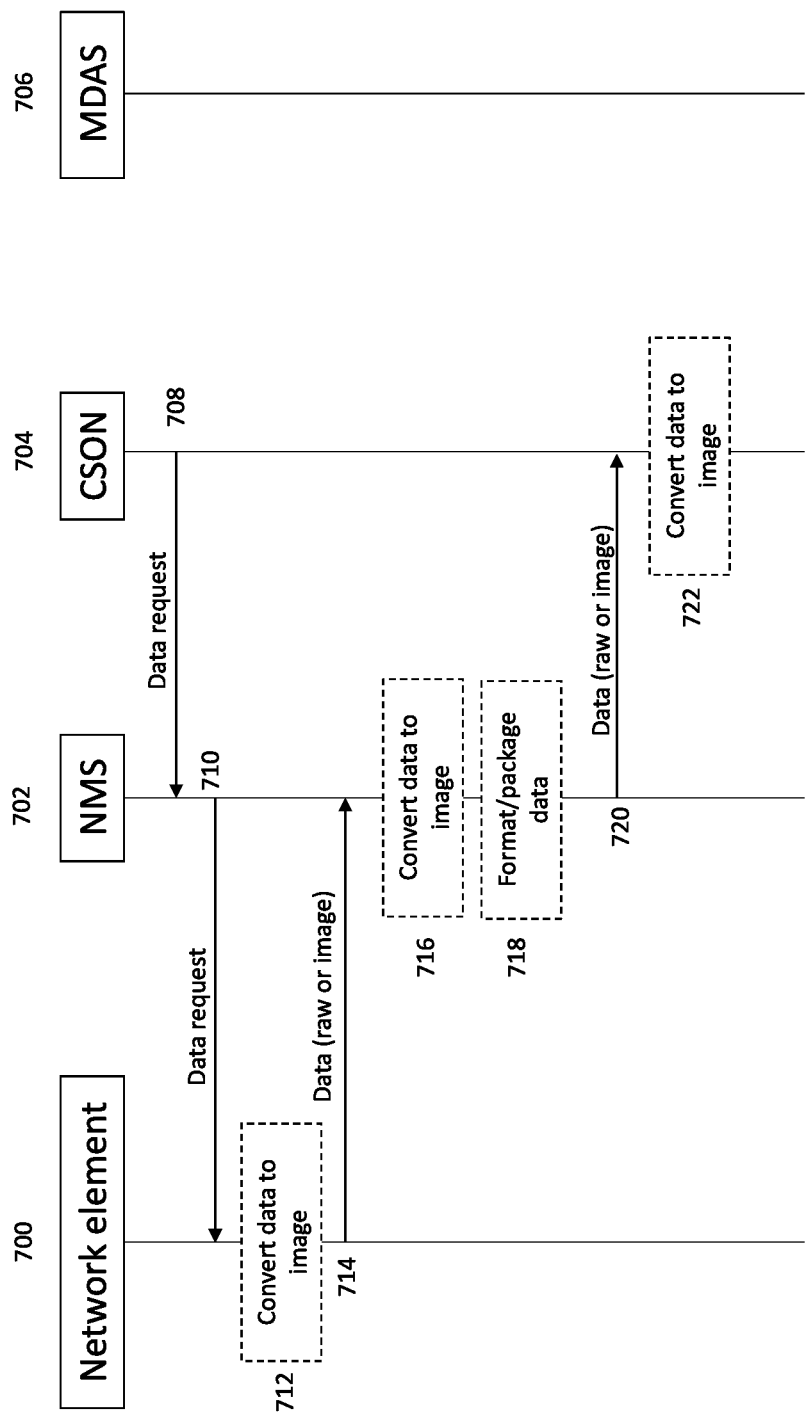
FIG. 7 shows an example sequence of information exchanges between different wireless network management components.
Figure 7:
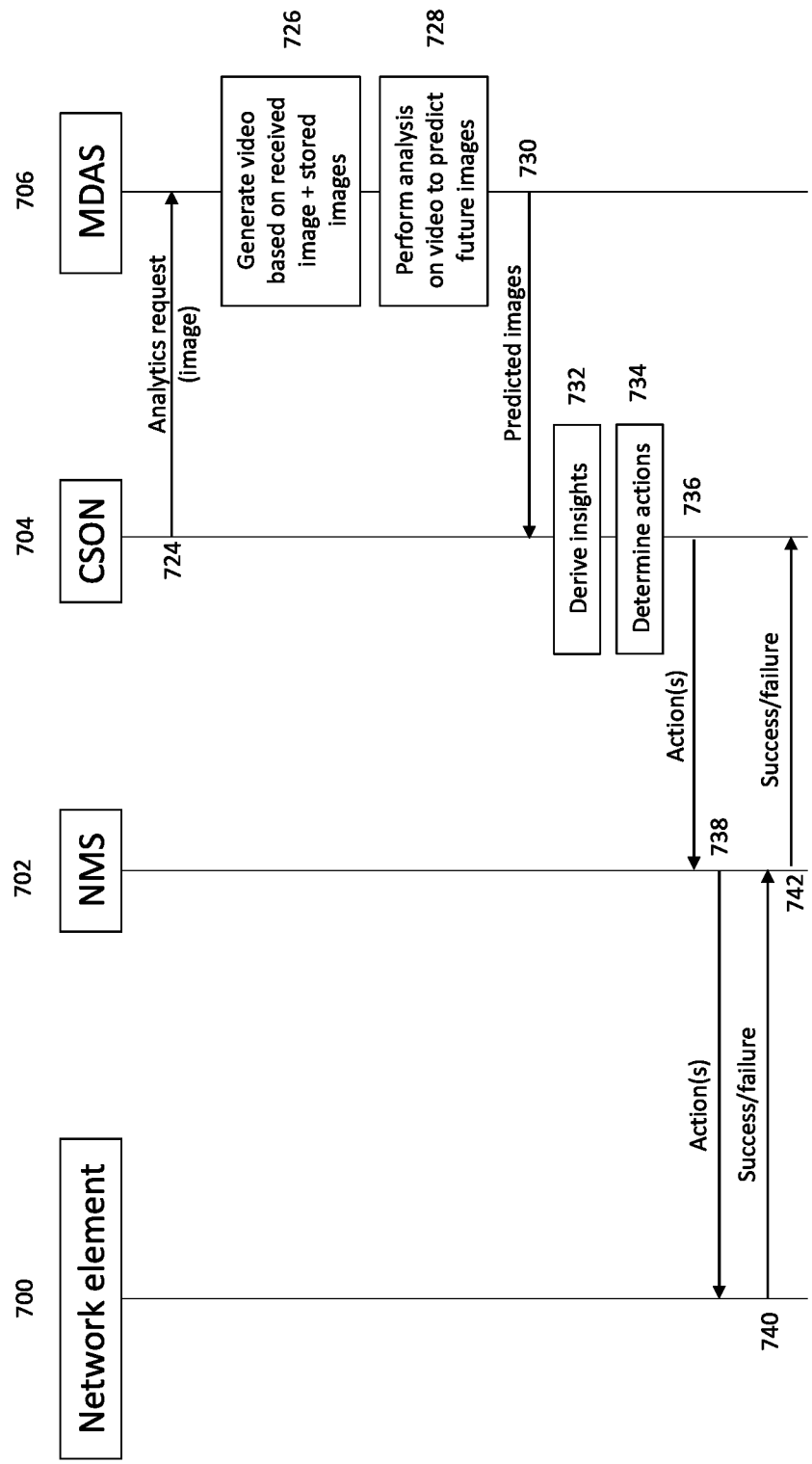

Reference is made to FIG. 7, which shows an example sequence of information exchanges between different wireless network management components.

In the example of FIG. 7, a network element 700 generates data. For example, the network element may generate PM counters, KPIs, trace data, or streaming data as described previously.

The network also comprises a management system. The management system comprises a NMS 702, CSON 704, and Management Data Analytics Service (MDAS) function 706. The MDAS may be a Predictive Analytics Service.

At step 708, CSON 704 requests NMS 702 to provide periodic data (e.g. PM/KPI/Trace/Troubleshooting/Streaming data) from one or more network elements in the network. While reference has been made to only one network element in the present example with respect to FIG. 7, it should be understood that in some examples data may be requested from a plurality of network elements.

The periodicity can be configurable, for example once in a day, one every hour, or the like. Furthermore, the granularity of PM data collection can be configurable between a few minutes to 1 hour. This may allow a lower granularity to be configured, because storing images can reduce the storage space required.

In some examples, PM Data can be categorized according to relevance usage, e.g., in radio aspects. For example, PM Counters related to Resource Utilization (positive counters) can be grouped together; similarly, MRO counters (negative counters) can be grouped together.

At 710, the NMS 702 requests the network element for the data.

At 712, an Image Creation Agent (ICA) hosted at the network element 700 optionally converts the requested data to one or more images.

At 714, the network element 700 responds with the request data in conventional (raw) formats or in image format to NMS 702.

At 716, an Image Creation Agent (ICA) hosted at NMS 702 optionally converts received conventional data to images.

At 718, NMS 702 optionally performs formatting/packaging of the data received from the network element or of the images created as needed.

At 720, NMS 702 responds to CSON 704 with the requested data in conventional format or in the image format.

At 722, if the data received by the CSON 704 from NMS 702 is in conventional format, CSON 704 creates images from the received data using an Image Creation Agent (ICA) hosted at CSON 704.

At 724, for each network element, CSON 704 requests MDAS function 706 to provide analytics based on the image(s) created at or received by the CSON 704.

At 726, MDAS function 706 uses historical (i.e. previously received and stored) images and current images (i.e. the images created at or received by the CSON) as frames of a video. That is to say, MDAS function 706 creates a video for an indicated network element.

At 728, MDAS function 706 applies analytics on the generated video, e.g. application of video analytics, to predict the next frames. As another example, the MDAS function may apply statistical comparative study across network elements.

At 730, for each Network Element, MDAS function 706 provides the desired analytics, e.g. predicted images, to CSON 704.

At 732, CSON 704 then cross-correlates the received analytics, e.g. predicted images, from multiple network elements, and derives insights.

At 734, based on the insights derived, CSON 704 decides which optimization needs to be triggered for selected set of network elements, e.g. cells, and derives one or more anticipatory actions and time to trigger the actions.

For example, based on anticipated changes in traffic patterns, an LBO operation can be triggered for a group of cells. As a further example, if predictions in neighbouring cells indicate that there may be lot of mobility in near future, then MRO optimizations can be triggered. Another example could be the need for antenna tilt optimizations in some cells, based on predictions.

At 736, when it is right time to trigger a determined action, CSON 704 requests NMS 702 to apply the derived action.

At 738, NMS 702 requests the network element 700 to apply the new action, e.g. apply a new configuration.

At 740, the network element 700 responds with an indication of success or failure status for the application of the action.

At 742, the NMS 702 responds to CSON 704 with an indication of the success or failure status for the application of the action.

In some examples, the Image Creation Agent (ICA) may convert network data into one or more images. Any Matrix can be converted into an image. Various techniques such as range-mapping, NLP based clustering with memory, time-stamp deltas, etc. may be implemented to convert various kinds of data into images. Timeseries and streaming data can be converted to images using fixed size blocks of data at-a-time. Well-known methods for converting data into images, such as Recurrence Plots, Gramian Angular Summation Fields, Gramian Angular Difference Fields, Markov Transition Fields, may be implemented.

As mentioned previously, the MDAS function can implement various AI/ML based techniques for Video analytics. Examples include but are not limited to Convolutional Models, Recurrent Models, Generative Models, and Variational Auto Encoders.

Such techniques may generate future frames of a video based on stored frames and frames generated from the received data. Future frames of a video, in the context of this disclosure, may be images representing future data for various network elements. These predicted images can be provided to CSON by the MDAS function.

At the CSON, algorithms like Structural Similarity Index Algorithm, CNN based Image analytics, and more can be used for correlating the Predicted images and identifying patterns in a fast and optimum manner. These patterns can be used to derive insights for anticipating the optimizations required in the future. This may allow CSON to plan and execute various optimizations in a proactive manner.

If Network Elements provide data in the form of images, decentralized SON (DSON) can utilize the Image and Video analytics methods, as proposed in this invention, to perform localized and near-real-time optimizations. However, in some examples DSON can have a smaller scope of optimization having the localized view of only the NE specific data.

Optimizations performed by CSON can have a broader view, and correlate insights for multiple networks elements, e.g. cells, and derive network level optimization actions to complement DSON actions.

Table 2 below shows an example of a possible raw PM/KPI data collected from a single cell. In the example of Table 2, each cell in this matrix can be represented by a pixel value.

TABLE 2

| Time | ERAB_DROPRATE | DL_Traffic_Vol | Avg_Lat_QC1 | Avg_Lat_All_QC1 | Avg_Act_User | %_DL_PRB_Util | State |
|---|---|---|---|---|---|---|---|
| Aug. 17, 2018 06:00 | 0 | 1549409704 | 6 | 138 | 1.69 | 53.5 | 0 |
| Aug. 17, 2018 06:00 | 0.7797271 | 1154343584 | 3 | 38 | 1.23 | 15.1 | 1 |
| Aug. 17, 2018 06:00 | 0.28011205 | 2437676344 | 5 | 123 | 2.09 | 43.7 | 0 |
| Aug. 17, 2018 06:15 | 0 | 798770464 | 3 | 47 | 1.19 | 23.9 | 0 |
| Aug. 17, 2018 06:15 | 0 | 1525732632 | 3 | 52 | 1.29 | 19.7 | 0 |
| Aug. 17, 2018 06:15 | 0.70077085 | 2228102448 | 4 | 109 | 1.91 | 41.9 | 1 |
| Aug. 17, 2018 06:30 | 0 | 882073488 | 3 | 37 | 1.15 | 16.2 | 0 |
| Aug. 17, 2018 06:30 | 0.66518847 | 1170000152 | 3 | 77 | 1.21 | 21 | 0 |
| Aug. 17, 2018 06:30 | 1.14192496 | 3767819784 | 4 | 84 | 2.31 | 59.7 | 1 |
| Aug. 17, 2018 06:45 | 0 | 1840078296 | 3 | 64 | 1.29 | 35.2 | 0 |
| Aug. 17, 2018 06:45 | 1.13636364 | 3251399416 | 4 | 74 | 1.51 | 45.7 | 1 |
| Aug. 17, 2018 06:45 | 0.41946309 | 3322649648 | 4 | 63 | 2.16 | 64.1 | 0 |
| Aug. 17, 2018 07:00 | 0 | 1706776096 | 3 | 40 | 1.37 | 29.9 | 0 |
| Aug. 17, 2018 07:00 | 0 | 3735506536 | 4 | 77 | 1.74 | 51.1 | 0 |
| Aug. 17, 2018 07:00 | 0.07806401 | 2944468808 | 4 | 71 | 2.03 | 55.5 | 0 |
| Aug. 17, 2018 07:15 | 0.81300813 | 2136406896 | 3 | 28 | 1.25 | 22.5 | 1 |
| Aug. 17, 2018 07:15 | 0.20120724 | 2322240784 | 3 | 60 | 1.32 | 34 | 0 |
| Aug. 17, 2018 07:15 | 0.47923323 | 3383452704 | 7 | 123 | 3.03 | 58.6 | 0 |

In the raw data, different columns have different ranges of numbers. Each number in each cell can be converted into a pixel value. In some examples, the Timestamp column may use a separate method to convert into a number which can be used as a pixel value.

Ranges of each column can be determined from the definitions of the PM counters or KPIs to which the columns relate. Each column, depending on the range of data, can be equally distributed in the complete range of possible pixel values.

For example, if a 24 bit PNG image is planned to be used as the image format, each pixel can have a 24 bit value. Thus, the range of pixel values can be from 0 to $(2^{24}-1)$.

If the range of values in a column is from 0 to 100 (for example in cases of percentage), a uniform distribution of pixel values can be mapped to every value in the column as follows, where the first number represents the column value, and the second number represents the pixel value:

$$0 \rightarrow 0;\ 1 \rightarrow (2^{24})/100*1;\ 2 \rightarrow (2^{24})/100*2 \ldots 100 \rightarrow (2^{24})$$

It should be understood that the number of bits per pixel may be dependent on the implementation.

In some examples, the timestamp column may be converted into numbers by computing the difference between timestamps of consecutive log entries. The difference may then considered for converting the logs into images. The timestamp difference is thus a number and can be considered as a pixel value in order to convert that column into pixels in a manner similar to that described above. An initial timestamp (e.g. timestamp for the first entry in the data) can be used in the filename of the stored image.

Figure 8:
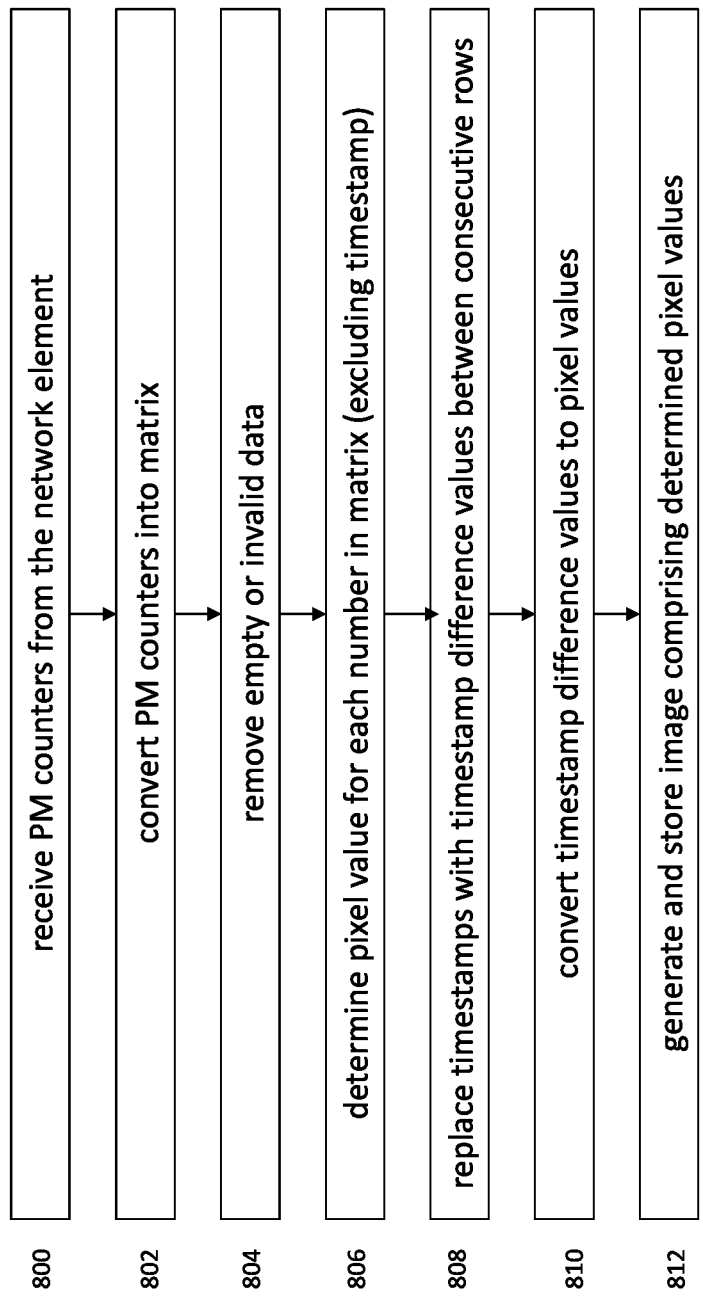
FIG. 8 shows a method for converting PM counter values to an image according to some examples.

Reference is made to FIG. 8, which shows a method for converting PM counter values to an image according to some examples.

At step 800, the ICA receives PM counters from the network element.

At step 802, the ICA converts the PM counters into a matrix.

At step 804, the ICA performs a clean-up operation on the data to remove any empty or invalid data. In this context, "empty" data may represent a part of the matrix where data is expected, but no data (or a default entry such as "none") was recorded. For example, if an eNB is not operational when a measurement is scheduled to take place, there may be an interruption in receiving PM data, and so "none" may be entered for that PM measurement value. An invalid data entry may for example be a data entry which was not recorded correctly, or where the data was not correctly received. In some examples, an invalid entry may be represented by "NA" or "N/A".

At step 806, the ICA determines a pixel value for each number in the matrix as described previously. Data in the timestamp column may be excluded from this operation.

At step 808, data in the timestamp column is replaced with timestamp difference values between consecutive rows as described previously, and the first timestamp in the matrix is used to name the file.

At step 810, the timestamp difference values are converted to pixel values in the same manner as described previously.

At step 812, an image comprising the determined pixel values is stored in a database. The image represents the PM counters received from the network element.

Figure 11:
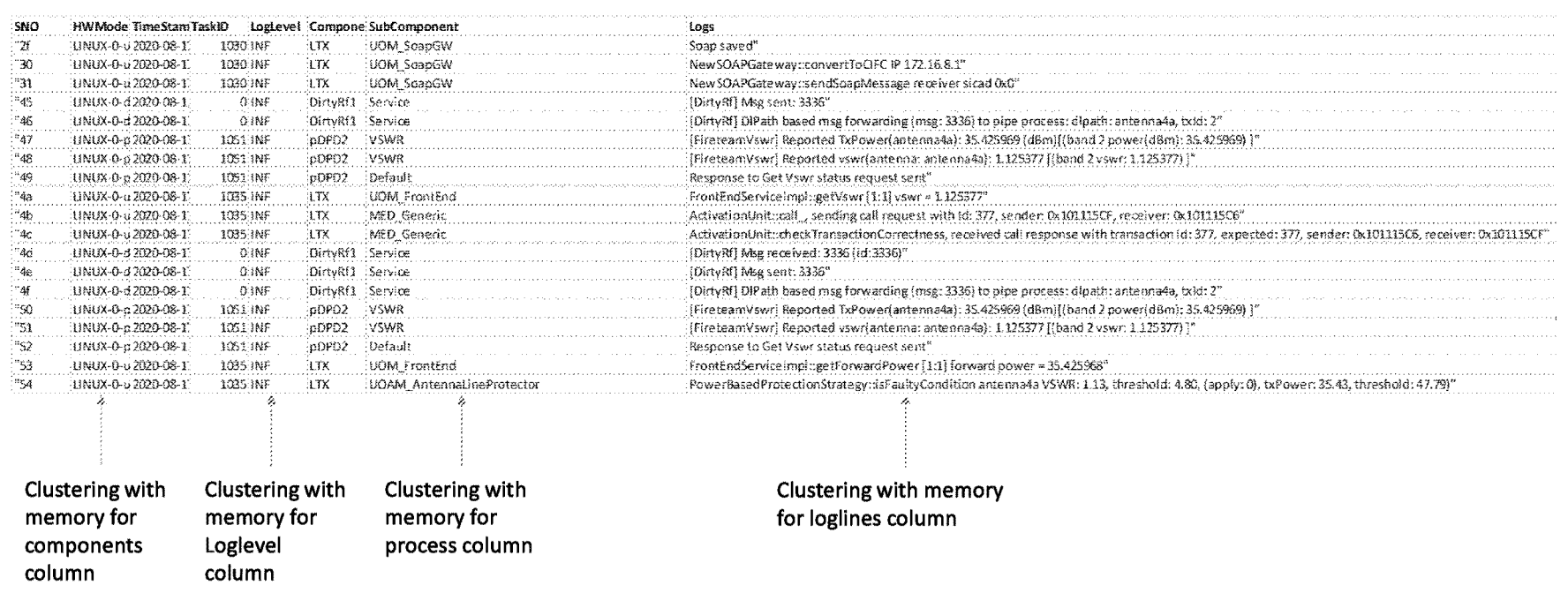

A further example is provided of an implementation for converting Troubleshooting Data into images. FIG. 11 shows an example CSV file generated from a text log file of troubleshooting data.

In the example of FIG. 11, the CSV File contains various columns like SNO, HWModel, Timestamp, TaskID, LogLevel, Component, SubComponent OR Process, Logs.

FIG. 11 also shows the "Clustering with Memory" technique being applied to various columns. "Clustering with Memory" is a clustering technique where a memory is created to store the mapping of various entries with respective Cluster ID assigned. Python, for example, provides an existing implementation of such a technique using a tool called Drain3.

This form of Clustering with Memory can be applied on all columns of the data file, except for the Timestamp column.

For the Timestamp column, the information that needs to be extracted is the initial timestamp, which is the first timestamp in the logs, and the difference between each consecutive timestamp.

Logs in the CSV file may be sorted in the order of timestamp. The timestamp column may then be converted into numbers by computing the difference between timestamps of consecutive log entries. The difference is then considered for converting the logs into images as described previously.

The difference between timestamps is a number and can be thus considered as a 24 bit or 32 bit pixel value in order to convert that column into pixels. Again, as described previously, the initial timestamp can be used as the filename of the stored image.

Tables 3 and 4 below show an example conversion described above, where the timestamps of table 3 are converted into difference values shown in table 4.

TABLE 3

| d7 | A0089 | <2020-03-10T06:50:23.411907Z>A1427 | A0156 | A1697 |
| fb | A0089 | <2020-03-10T06:50:25.914896Z>A1427 | A0156 | A1697 |
| 2  | A0089 | <2020-03-10T06:50:28.415422Z>A1427 | A0156 | A1697 |
| 0c | A0089 | <2020-03-10T06:50:30.915124Z>A1427 | A0156 | A1697 |
| 19 | A0089 | <2020-03-10T06:50:33.415129Z>A1427 | A0156 | A1697 |
| 36 | A0089 | <2020-03-10T06:50:35.917653Z>A1427 | A0156 | A1697 |
| 47 | A0089 | <2020-03-10T06:50:38.417670Z>A1427 | A0156 | A1697 |
| 4f | A0089 | <2020-03-10T06:50:40.917541Z>A1427 | A0156 | A1697 |
| 59 | A0089 | <2020-03-10T06:50:43.432884Z>A1427 | A0156 | A1697 |
| 74 | A0089 | <2020-03-10T06:50:45.941945Z>A1427 | A0156 | A1697 |
| 75 | A0089 | <2020-03-10T06:50:48.433909Z>A1427 | A0156 | A1697 |

TABLE 4

| id | component | timedelta | level | process | log |
|----|-----------|-----------|-------|---------|-------|
| XX | A0087 | 915870 | A1423 | A0142 | A1651 |
| XX | A0073 | 667119 | A1423 | A0142 | A1651 |
| XX | A0075 | 898474 | A1424 | A0147 | A1647 |
| XX | A0075 | 535061 | A1424 | A0147 | A1647 |
| XX | A0080 | 11670 | A1419 | A0147 | A1647 |
| XX | A0080 | 13937 | A1419 | A0147 | A1647 |
| XX | A0080 | 39028 | A1419 | A0147 | A1647 |
| XX | A0080 | 9307 | A1419 | A0147 | A1647 |
| XX | A0072 | 927533 | A1424 | A0147 | A1647 |
| XX | A0072 | 952533 | A1424 | A0147 | A1647 |
| XX | A0073 | 613562 | A1422 | A0147 | A1647 |
| XX | A0073 | 660606 | A1422 | A0147 | A1647 |
| XX | A0073 | 723621 | A1422 | A0147 | A1647 |

After converting all columns into numbers, each entry is considered as a pixel value and with appropriate image formatting header, the matrix can be converted into an image.

Figure 9:
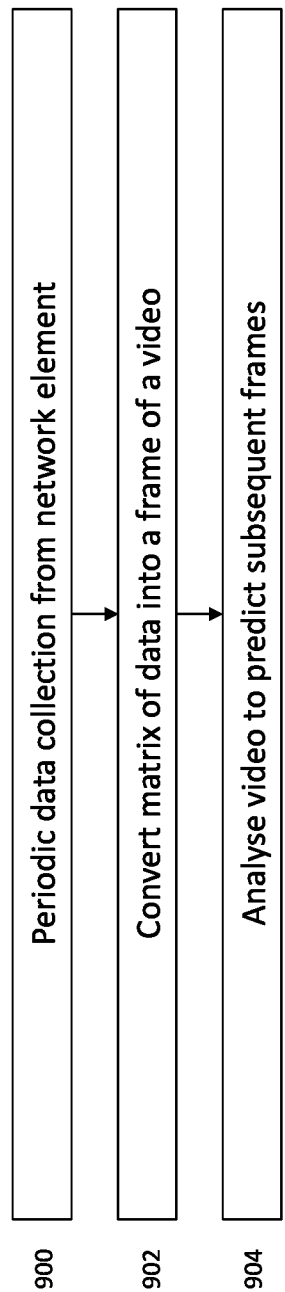
FIG. 9 shows a method according to some examples.

Reference is made to FIG. 9, which shows a method according to some examples.

At 900, data (such as PM/KPI/Trace/Troubleshooting/Streaming Data) is collected periodically from a network element, for example once every day at the same time, and stored as a matrix.

At 902, each matrix is converted into an image and stored as a frame of a video.

For example, if the data is collected once a day, then data for a first day is converted into a first image (with the initial timestamp stored as metadata), and the first image represents a first frame in a video. For a second day, the data for the second day is converted into a second image representing a second frame in the video. This process repeats for each subsequent data collection to generate a video comprising a sequence of N image frames, each image frame representing data collected from a network entity over N days (or whatever collection time period is being used). Metadata may also be associated with each image frame, the metadata representing the initial timestamp in the data for each day.

At 904, analysis is performed on the video predict subsequent frames, and hence, predict the future data (e.g. PM/KPI/Trace/Troubleshooting/Streaming Data).

In some examples, a limited number of subsequent frames may be predicted. For example, if one frame represents one day, and, if 5 frames can be predicted, data can be predicted for 5 days in advance.

This may allow proactive risk mitigation steps, enhanced and proactive network optimization steps, and even planned movements of moving nodes, to be performed.

In some examples, Network Elements can either send raw data to DSON and/or CSON. Alternatively, Network elements can send Images and CSON/DSON can categorize and forward these to Predictive Video Analytics based Services.

In some examples, various modifications to 3GPP standards may be implemented to facilitate various aspects of the present disclosure.

For example, in 3GPP TS 28.104 (relating to MADS specifications):
Capability:
REQ-MDA_IMG_CON-1: The MDA producer may have a capability to accept periodic data in the form of images from MnS producer and apply image and video analytics.
REQ-MDA_IMG_CON-2: The MDA producer may have a capability to provide image and video analytics outcomes in the form of images to the MDA consumer.

Input Data:

The following data may be used to perform the analysis.

| Data category | Data to be used |
|---|---|
| Image representing PM or KPI or Trace or Troubleshooting Data for a certain duration | Following meta-data may be included:<br>MnS Producer ID<br>Start Time of Data collection<br>End Time of Data collection<br>Image file type: Example PNG/JPG<br>ENUM:<br>  PM<br>  KPI<br>  Trace<br>  Troubleshooting<br>Measurement scope<br>  Per Slice<br>  Per UE<br>  Per Group of UEs<br>  Per Cell<br>  Per gNodeB<br>  Per Network Function/Managed Object<br>Type of data: real-time, non-real-time<br>Filters<br>  Geographical area<br>  Threshold crossing |
| Video representing PM or KPI or Trace or Troubleshooting Data for a certain duration | Following meta-data may be included:<br>MnS Producer ID<br>Number of frames in the video<br>  Each frame is an image of same type, with same meta-data as explained above.<br>Start time of first frame in the video<br>End time of last frame in the video<br>Image data: Type of measurement, Measurement scope, Type of data, Filters |
| Type of analytics | ENUM:<br>  Prediction (0)<br>  Statistical (1)<br>  Recommendation Options (2)<br>  RCA (3)<br>Start time of Prediction, if applicable<br>End time of Prediction, if applicable<br>Image/Video analytics method<br>Reporting method: File-based, Streaming, Notification<br>Output Format: Image/Video |

Analysis Report:

The image and/or video analytics report may comprise information/values corresponding to at least one of the following listed attributes.

| Attribute Name | Description |
|---|---|
| Predicted Images representing PM or KPI or Trace or Troubleshooting Data | Following meta-data may be included:<br>MDA Consumer ID<br>Start Time of Predicted duration<br>End Time of Predicted duration<br>Image file type: Example PNG/JPG<br>Video analytics method used<br>Target Objects: UE(s), Geographical Area, Slice, etc.<br>Analytics Type: Statistics, Prediction, Recommendation Options, RCA<br>Confidence Degree |
| Statistical comparative Study | Comparative study from the history for the given scope of input<br>Scope of input: UEs/Cells/slice etc<br>Similarity Object: Object ID1, Object ID2<br>Statistical Similarity Index: In the range of −1 to 1, 1 indicating high positive similarity, −1 indicating high inverse similarity and 0 indicating no similarity<br>Statistical Similarity Heatmap: Matrix (or) Heatmap Image |

In another example, in 3GPP TS 28.622: Proposals with info models for images used to send data from network elements to NMS/C-SON/MDAS may include the following attributes of performance measurement images information models:

| Attribute name | Description | Support Qualifier |
|---|---|---|
| MOI | The managed Object Instance representing Performance Measurements collected from a network element, e.g. a Cell | M |
| File_Name | The name of the file may be in the format <Cell ID>_PM_<Starting Timestamp>.<EXT> <EXT>: File extensions can be like PNG/BMP (normal image file extensions) | M |
| Periodicity | Periodicity of collecting full set of PM counters from, e.g. a Cell, Allowed values are 12-24 hours (say) | M |
| Granularity | Granularity of PM Counters aggregation Allowed values are 5 min, 15 min, 30 min, 1 hour | M |

Examples of Performance Measurement Images

| Examples | MOI | File_Name | Periodicity | Granularity |
|---|---|---|---|---|
| All PM counters collected from Cell ID 905673_EPUNFDDTATHAWADE2 | Cell | 905673_EPUNFDDTATHAWADE2_PM_07042021_1200.PNG | 24 hours | 5 minutes |
| All PM counters collected from Cell ID 936050_EPUNFDDVENUNGR3 | Cell | 936050_EPUNFDDVENUNGR3_PM_07042021_1200.BMP | 12 hours | 5 minutes |

Attributes of KPIs Images Information Models

| Attribute name | Desription | Support Qualifier |
|---|---|---|
| MOI | The managed Object Instance representing KPIs collected from a network element, e.g. a Cell | M |
| File_Name | The name of the file may be in the format <Cell ID>_KPI_<Starting Timestamp>.<EXT> <EXT>: File extensions can be like PNG/BMP/JPG (normal image file extensions) | M |
| Periodicity | Periodicity of collecting full set of KPIs from e.g. a Cell, Allowed values are 12-24 hours (say) | M |
| Granularity | Granularity of KPI collection Allowed values are 5 min, 15 min, 30 min, 1 hour | M |

Examples of KPI Images

| Examples | MOI | File Name | Periodicity | Granularity |
|---|---|---|---|---|
| All KPIs collected from Cell ID 905673_EPUNFDDTATHAWADE2 | Cell | 905673_EPUNFDDTATHAWADE2_KPI_07042021_1200.PNG | 24 hours | 5 minutes |
| All KPI counters collected from Cell ID 936050_EPUNFDDVENUNGR3 | Cell | 936050_EPUNFDDVENUNGR3KPI_07042021_1200.BMP | 12 hours | 5 minutes |

It should be understood that further modifications to 3GPP standards may be implemented when applicable for implementing aspects of the disclosure.

Figure 10:
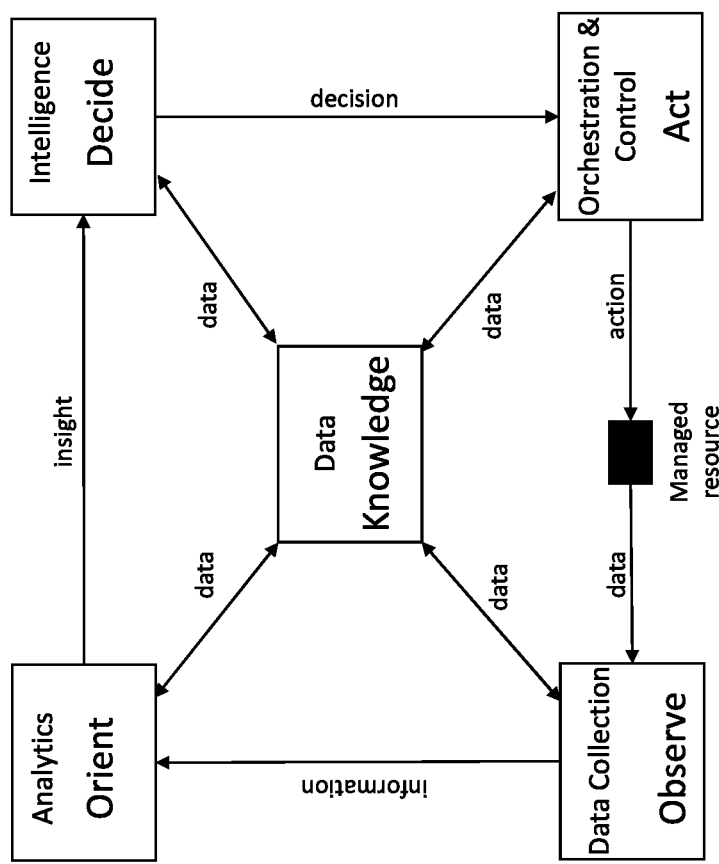
FIG. 10 shows an example Observe, Orient, Decide, Act (OODA) control loop.

Reference is made to FIG. 10, which shows an example Observe, Orient, Decide, Act (OODA) control loop. FIG. 10 is taken from ETSI GS ZSM002, which relates to Zero-touch network and Service Management.

The control loop of FIG. 10 also features a knowledge step. Different types of data can be written to or read from the knowledge step of the closed loop—for example, collected data (PM), topology, insight/recommendation, decisions, plans, workflows etc.

In the observe step, data is collected from one or more network elements. In some examples, the data collection may be periodic, for example daily. The network element may collect data, which may be raw data (e.g. PM, KPI, Trace, Logs, Streaming Data or the like), and converted to images created from the data as described previously at the network element, before sending the data as images to the CSON/DSON. Alternatively, the network element may collect the raw data and send the raw data to CSON/DSON, and the CSON/DSON then converts the raw data into images.

In the orient step, analysis is performed on the data, for example by a Predictive Analytics Service. In some examples, the CSON may provide the images (either received from the network element or created at the CSON/DSON based on data received from the network element) to the MDAS producer. The MDAS producer may then store the received images, and generates a video comprising a sequence of stored images from the same network element. The MDAS function then predicts future frames of the video, and sends the predicted frames to CSON.

In the decide step, the CSON derives insights. In some examples, the CSON derives insights from the predicted frames, and may correlate the insights across multiple network elements. The CSON may determine one or more proactive actions to be taken for performance optimization based on the insights. For example, the CSON may determine one or more actions to be taken at one or more network elements.

In the act step, the CSON applies the one or more actions at the one or more network elements.

Thus, in some examples, a function such as an Image Creation Agent (ICA) may create images from network data (such as PM/KPI/Trace/Trouble shooting Logs/Streaming Data). The ICA can be hosted at Network elements and/or NMS and/or CSON. Network Elements may be adapted to be capable of sending images to CSON/DSON for the generated data. The CSON/DSON may be adapted to be capable of receiving images from Network Elements, along with conventional data formats. The CSON may have an interface with MDAS for sending and receiving images and predictions of future network element behaviours. Unified Video Prediction based analytics methods may be implemented for predicting all kinds of data generated by the wireless network elements based on the images received at the MDAS.

In some examples, there is provided an apparatus comprising means for receiving, at an image creation agent, a data set; generating, by the image creation agent, based on the received data set, an image associated with the data set, wherein pixel values in the image represent values of data entries of a plurality of rows of data of the data set; and outputting, from the image creation agent, the generated image.

In some examples, the apparatus may comprise at least one processor and at least one memory including a computer program code, the at least one memory and computer program code configured to, with the at least one processor, cause the apparatus at least to: receive, at an image creation agent, a data set; generate, by the image creation agent, based on the received data set, an image associated with the data set, wherein pixel values in the image represent values of data entries of a plurality of rows of data of the data set; and output, from the image creation agent, the generated image.

In some examples, there is provided an apparatus comprising means for: generating, at a network element, a data set over a data collection period; providing, by the network element, the data set to an image creation agent; receiving, at the network element from the image creation agent, at least one image associated with the data set for the data collection period, wherein pixel values in the at least one image represent values of data entries of a plurality of rows of data of the data set; and sending, from the network element to a network management system, the at least one image.

In some examples, the apparatus may comprise at least one processor and at least one memory including a computer program code, the at least one memory and computer program code configured to, with the at least one processor, cause the apparatus at least to: generate, at a network element, a data set over a data collection period; provide, by the network element, the data set to an image creation agent; receive, at the network element from the image creation agent, at least one image associated with the data set for the data collection period, wherein pixel values in the at least one image represent values of data entries of a plurality of rows of data of the data set; and send, from the network element to a network management system, the at least one image.

In some examples, there is provided an apparatus comprising means for: receiving, at a network management system from a network element, at least one image associated with a data set, wherein pixel values in the at least one image represent values of data entries of a plurality of rows of data of the data set; and sending, from the network management system to a self-organizing network, the image.

In some examples, the apparatus may comprise at least one processor and at least one memory including a computer program code, the at least one memory and computer program code configured to, with the at least one processor, cause the apparatus at least to: receive, at a network management system from a network element, at least one image associated with a data set, wherein pixel values in the at least one image represent values of data entries of a plurality of rows of data of the data set; and send, from the network management system to a self-organizing network, the image.

In some examples, there is provided an apparatus comprising means for: receiving, at a self-organizing network from a network management system, at least one image associated with a data set, wherein pixel values in the at least one image represent values of data entries of a plurality of rows of data of the data set; and sending, from the self-organizing network to an analytics function, the at least one image.

In some examples, the apparatus may comprise at least one processor and at least one memory including a computer program code, the at least one memory and computer program code configured to, with the at least one processor, cause the apparatus at least to: receive, at a self-organizing network from a network management system, at least one image associated with a data set, wherein pixel values in the at least one image represent values of data entries of a plurality of rows of data of the data set; and send, from the self-organizing network to an analytics function, the at least one image.

In some examples, there is provided an apparatus comprising means for: receiving, at an analytics function, at least one image associated with a data set, wherein pixel values in the at least one image represent values of data entries of a plurality of rows of data of the data set; performing predictive or statistical analysis on the at least one image to generate one or more further images, wherein pixel values of the one or more further images represent values of further data entries of a plurality of rows of predicted data for the network element; and outputting, to the self-organizing network, the one or more further images.

In some examples, the apparatus may comprise at least one processor and at least one memory including a computer program code, the at least one memory and computer program code configured to, with the at least one processor, cause the apparatus at least to: receive, at an analytics function, at least one image associated with a data set, wherein pixel values in the at least one image represent values of data entries of a plurality of rows of data of the data set; perform predictive or statistical analysis on the at least one image to generate one or more further images, wherein pixel values of the one or more further images represent values of further data entries of a plurality of rows of predicted data for the network element; and output, to the self-organizing network, the one or more further images.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

What is claimed is:

1. An apparatus comprising means for:
   receiving, at an image creation agent, a data set, wherein the data set contains data relating to periodic streaming data;
   determining, for a first row of data of the data set, a first timestamp, wherein the data set comprises timestamp information for the plurality of rows of data;
   associating the first timestamp with the data set as metadata;
   determining timestamp difference information between consecutive rows of data in the data set;
   generating, by the image creation agent, based on the data set, an image associated with the data set, wherein pixel values in the image represent values of data entries of a plurality of rows of data of the data set, and wherein the generating utilises the timestamp difference information; and
   outputting, from the image creation agent, the generated image.

2. The apparatus of claim 1, wherein the data set contains data relating to at least one of:
   performance measurements;
   key performance indicators;
   trace measurements; and
   troubleshooting measurements.

3. The apparatus of claim 1, wherein the apparatus is comprised in at least one of:
   a network element;
   a network management system; and
   a centralized self-organizing network.

* * * * *